(12) United States Patent
Kanade et al.

(10) Patent No.: US 8,911,131 B2
(45) Date of Patent: Dec. 16, 2014

(54) ENERGY EFFICIENT CONCENTRIC ILLUMINATORS FOR ILLUMINATING A SHEET

(75) Inventors: Udayan Kanade, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 176 days.

(21) Appl. No.: 13/599,190

(22) Filed: Aug. 30, 2012

(65) Prior Publication Data

US 2012/0327681 A1 Dec. 27, 2012

Related U.S. Application Data

(63) Continuation of application No. 13/176,836, filed on Jul. 6, 2011, now Pat. No. 8,277,103, and a continuation of application No. 11/754,227, filed on May 25, 2007, now Pat. No. 7,997,781.

(30) Foreign Application Priority Data

May 25, 2006 (IN) .......................... 800/MUM/2006

(51) Int. Cl.
*F21V 7/04* (2006.01)
*F21V 11/00* (2006.01)
*G02B 5/02* (2006.01)
*H01J 5/16* (2006.01)
*F21V 8/00* (2006.01)

(52) U.S. Cl.
CPC ............ *G02B 6/0028* (2013.01); *G02B 6/0068* (2013.01); *G02B 6/0078* (2013.01); *G02B 6/0031* (2013.01); *G02B 6/0025* (2013.01)

USPC ........... 362/558; 362/600; 362/608; 362/609; 362/551; 385/127; 385/88

(58) Field of Classification Search
CPC .. G02B 6/0016; G02B 6/0028; G02B 6/0051; G02B 6/0096
USPC ......... 362/558, 551, 355, 612, 600, 613, 608, 362/609, 217, 260, 610, 611, 606, 97.1, 362/293, 607, 311.02, 257; 385/122, 123, 385/127, 88, 901, 8, 39; 359/850, 690, 15; 349/64, 58, 156
See application file for complete search history.

(56) References Cited

U.S. PATENT DOCUMENTS

| 4,422,719 A | * | 12/1983 | Orcutt | ............................ 385/123 |
| 4,466,697 A | * | 8/1984 | Daniel | ............................ 385/123 |
| 4,924,612 A | * | 5/1990 | Kopelman | ...................... 40/547 |
| 5,101,325 A | * | 3/1992 | Davenport et al. | ............ 362/628 |

(Continued)

FOREIGN PATENT DOCUMENTS

WO PCT/US07/69820 9/2008

*Primary Examiner* — Nimeshkumar Patel
*Assistant Examiner* — Jose M Diaz

(57) ABSTRACT

An apparatus and method for coupling light from concentric illuminators into a light source in the form of a surface are disclosed. According to one embodiment, the apparatus comprises a plurality of concentric tubes, each tube including a light diffuser. The apparatus also has a sheet having a first edge with the plurality of concentric tubes placed along the first edge. Each tube of the plurality of concentric tubes diffuses light such that the light emanates in a predetermined pattern along the first edge of the sheet.

10 Claims, 9 Drawing Sheets

(56) References Cited

U.S. PATENT DOCUMENTS

| | | | |
|---|---|---|---|
| 5,363,470 A * | 11/1994 | Wortman | 385/147 |
| 5,570,447 A * | 10/1996 | Liu | 385/125 |
| 5,579,429 A * | 11/1996 | Naum | 385/143 |
| 6,231,200 B1 * | 5/2001 | Shinohara et al. | 362/619 |
| 6,282,355 B1 * | 8/2001 | Zarian et al. | 385/128 |
| 6,594,417 B1 * | 7/2003 | Hulse | 385/31 |
| 6,595,652 B2 | 7/2003 | Oda et al. | |
| 6,796,697 B1 | 9/2004 | Bragg et al. | |
| 6,805,468 B2 | 10/2004 | Itoh et al. | |
| 6,941,056 B2 | 9/2005 | Hirota | |
| 6,963,447 B2 | 11/2005 | Honda | |
| 7,260,297 B2 * | 8/2007 | Hajto et al. | 385/115 |
| 7,306,357 B2 | 12/2007 | Han et al. | |
| 7,314,302 B2 | 1/2008 | Lee | |
| 7,484,873 B2 | 2/2009 | Dejima et al. | |
| 7,549,783 B2 * | 6/2009 | Cassarly et al. | 362/559 |
| 7,937,865 B2 * | 5/2011 | Li et al. | 40/542 |
| 8,007,157 B2 * | 8/2011 | Lin | 362/560 |
| 2004/0170011 A1 | 9/2004 | Kim et al. | |
| 2005/0042453 A1 | 2/2005 | James et al. | |
| 2006/0153511 A1 * | 7/2006 | Franklin et al. | 385/123 |
| 2007/0189701 A1 * | 8/2007 | Chakmakjian et al. | 385/146 |
| 2010/0053970 A1 * | 3/2010 | Sato et al. | 362/259 |

* cited by examiner

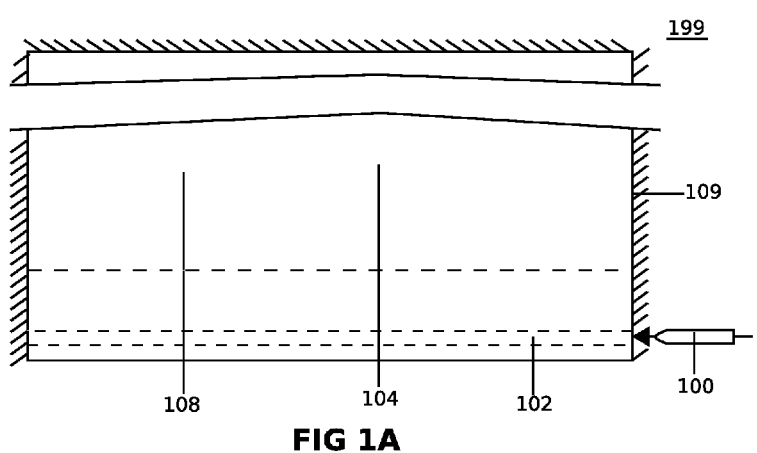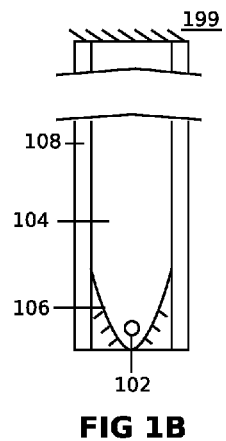
FIG 1A  FIG 1B
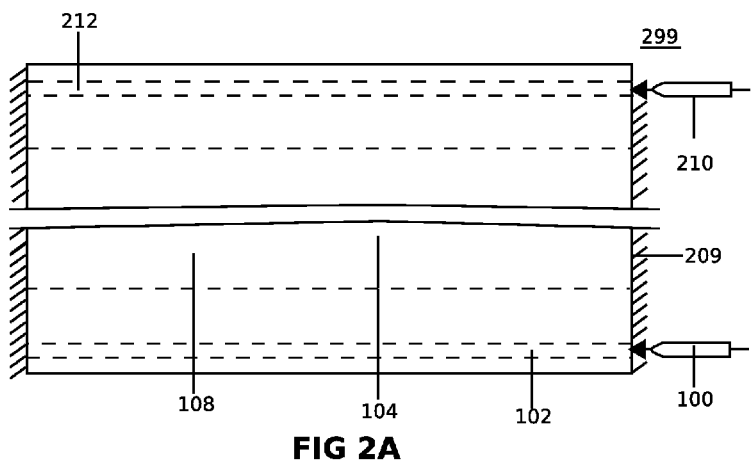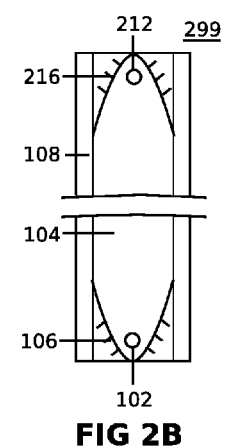
FIG 2A  FIG 2B

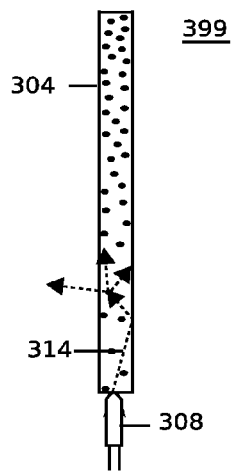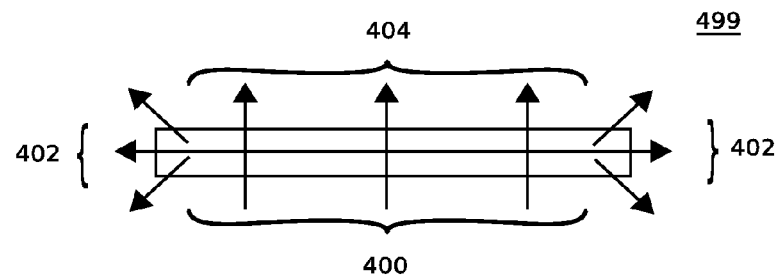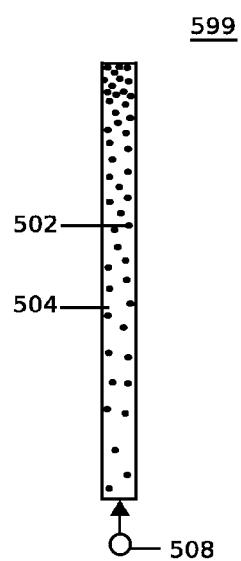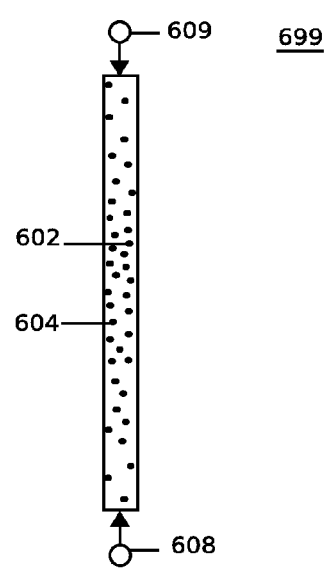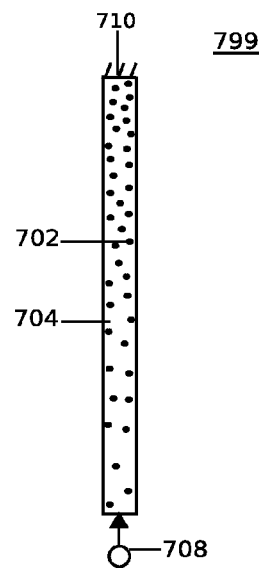

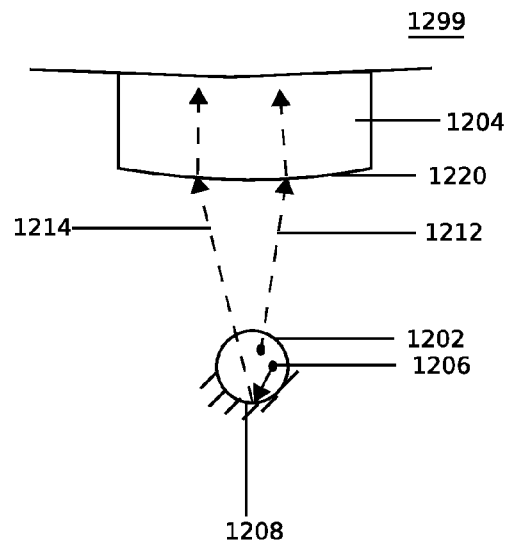
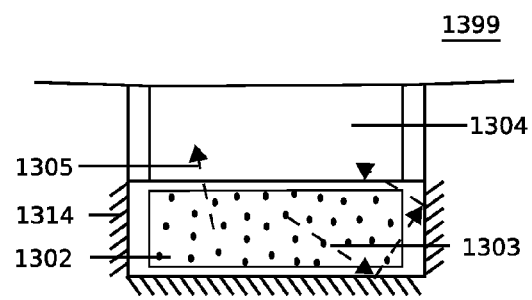
FIG 12
FIG 13
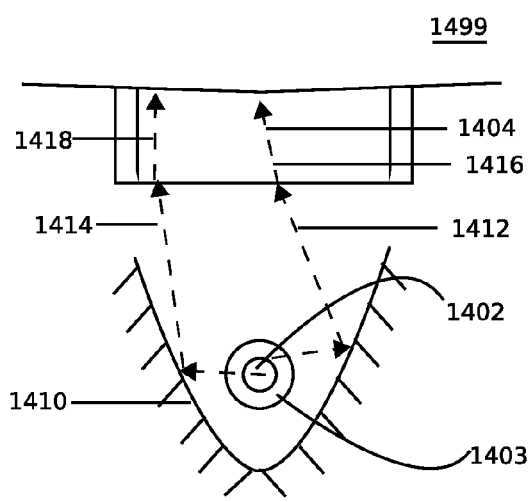
FIG 14

ENERGY EFFICIENT CONCENTRIC ILLUMINATORS FOR ILLUMINATING A SHEET

The present application is a continuation of patent application Ser. No. 13/176,836 entitled "SUBSTANTIALLY TRANSPARENT LINEAR LIGHT SOURCE" filed on Jul. 6, 2011, which in turn was a continuation of U.S. Pat. No. 7,997,781 entitled "ENERGY EFFICIENT ILLUMINATION FOR A LIGHT SOURCE IN THE FORM OF A SURFACE" filed on May 25, 2007 at the USPTO, which in turn claimed the benefit of and priority to Indian Provisional Patent Application No. 800/MUM/2006 entitled "ENERGY EFFICIENT ILLUMINATION FOR LIGHT SOURCE IN THE FORM OF A SURFACE" and filed on May 25, 2006.

FIELD

The present invention relates to an illumination system. Particularly, the invention relates to an apparatus for energy efficient illumination for a light source in the form of a surface.

BACKGROUND

Illumination is used to light objects for seeing, as also for photography, microscopy, scientific purposes, entertainment productions (including theatre, television and movies), projection of images and as backlights of displays. For illumination purposes, systems in the form of point or single dimensional sources of light are used. Such systems have many drawbacks: light intensity is very high at the light source compared to the rest of the room or environment, and thus such light sources are hurtful to the eye. Such sources also cast very sharp shadows of objects, which are not pleasing to the eye, and may not be preferred for applications such as photography and entertainment production. Such sources also cause glare on surfaces such as table tops, television front panels and monitor front panels.

There are systems that act as light sources in the form of a surface. Fluorescent lights for home lighting may be covered by diffuser panels to reduce the glare. These systems are bulky. They are also not transparent. Diffusers and diffuse reflectors, such as umbrella reflectors, are used as light sources for photography and cinematography, but they are only approximations to uniform lighting.

Backlights of flat-panel screens such as LCD screens provide uniform or almost uniform light. One of the prior solutions for backlighting an LCD screen is to have a light guide in the form of a sheet, with some shapes such as dots or prisms printed on it to extract light or by dispersing light diffusing particles in the bulk. The light guide is formed by sandwiching a high refractive index material between two low refractive index materials. The light is guided from one or more ends of the sheet.

These light sources in the form of a surface actually just redirect the light from some other primary light source, in some predetermined emanation pattern. This primary source of light has to be coupled efficiently to the light source in the form of a surface. Light sources used for this application include CCFL tubes, array of LEDs etc.

Two CCFL tubes, one at each end of the sheet may be used. Each CCFL tube is placed inside a reflecting trough having a rectangular cross section. The light from the CCFL tube is coupled to the sheet. The disadvantage of this method is that the light may have to undergo many reflections before it enters the sheet. Each of these reflections cause some wastage of light and leads to inefficiency. Moreover, there is no control on the direction in which the light enters the sheet. Some part of light is reflected back into the CCFL and this leads to further wastage of light. Some part of the light entering the edge of the backlight sheet exits the opposite edge. Part of this light falls upon the opposite CCFL, and is lost, leading to further inefficiency.

Flat screen color displays normally use illumination in the form of white light. The white light falls on the display such as a LCD which uses color filters to depict colors. Color filters reduce efficiency of the display since large amounts of light are absorbed. Another disadvantage is that because of the color filters, the transmittance of the display is very low. To avoid using color filters, colored light needs to be used. This colored light has to be coupled properly to display the correct colors.

SUMMARY

An apparatus and method for coupling light from concentric illuminators into a light source in the form of a surface are disclosed. According to one embodiment, the apparatus comprises a plurality of concentric tubes, each tube including a light diffuser. The apparatus also has a sheet having a first edge with the plurality of concentric tubes placed along the first edge. Each tube of the plurality of concentric tubes diffuses light such that the light emanates in a predetermined pattern along the first edge of the sheet.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 1A illustrates a block diagram of an exemplary light source system as seen from the front, according to one embodiment.

FIG. 1B illustrates a block diagram of an exemplary light source system as seen from a side, according to one embodiment.

FIG. 2A illustrates a block diagram of an exemplary light source system as seen from the front, according to one embodiment.

FIG. 2B illustrates a block diagram of an exemplary light source system as seen from a side, according to one embodiment of the invention.

FIG. 3 illustrates a block diagram of a light source system as viewed from the front, according to one embodiment.

FIG. 4 illustrates a block diagram of an exemplary element of a linear light source column, according to an embodiment.

FIG. 5 illustrates a diagram of a linear light source having a varied concentration of diffuser particles, according to one embodiment.

FIG. 6 illustrates an exemplary linear light source having two light sources, according to one embodiment.

FIG. 7 illustrates a diagram of an exemplary mirrored linear light source, according to one embodiment.

FIG. 12 illustrates a block diagram of a light coupling system, according to one embodiment.

FIG. 13 illustrates a block diagram of a light coupling system, according to one embodiment.

FIG. 14 illustrates a block diagram of an exemplary light source of a backlight, according to one embodiment.

DETAILED DESCRIPTION

Figure 8:
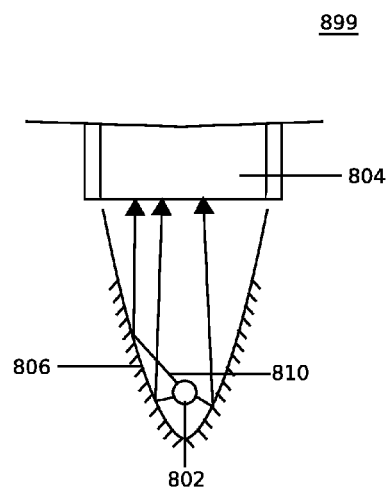
FIG. 8 illustrates a block diagram of an exemplary light source of a backlight, according to one embodiment.

An apparatus and method for coupling light from concentric illuminators into a light source in the form of a surface are disclosed. According to one embodiment, the system comprises a plurality of concentric tubes placed along an edge of the light source in the form of a surface. Each tube of the plurality of concentric tubes includes a distribution of dispersing material. The dispersing material disperses light traveling in the plurality of concentric tubes, in a predetermined pattern and couples it to the light source in the form of a surface.

According to an embodiment, an apparatus to efficiently couple the linear source of light and the light source in the form of a surface is described.

According to another embodiment, an apparatus to efficiently couple the colored linear sources of light and the multicolored backlight sheet is described.

According to another embodiment, an apparatus to efficiently couple the primary source of light such as an LED and the linear source of light is described.

FIG. 1A illustrates a block diagram of an exemplary light source system 199 as seen from the front, according to one embodiment. A primary light source 100 is coupled to a linear light source 102. Primary light source can be any point source of light including LEDs, LASERs, OLEDs, etc. The linear light source of 102 has a cylindrical waveguide of a transparent material. A light source in the form of surface 104 (core), that is a sheet of transparent material. In one embodiment, the refractive index of the linear light source is greater than that of the core. The core 104 also has a higher refractive index than cladding sheet 108. Linear light source 102 has a sparse distribution of light diffusers. The light diffuser is one or more of a metallic powder, metallic pigment, organic powder, and organic pigment. The light diffuser reflects incident light. In an alternate embodiment, the light diffuser is one or more of a transparent particle, and transparent bubble. The light diffuser disperses light by refraction. The light traveling inside the linear source of light gets scattered when it hits the dispersing particles and escapes from the linear source. Some of this light enters the core 104. The linear light source 102 is placed at a focus point of a reflecting surface 106 which may be any light reflector, including metallic surfaces, distributed Bragg reflectors, hybrid reflectors, total internal reflectors or omni-direction reflectors. In one embodiment, the reflecting surface is parabolic in shape. The light from the linear source travels towards the reflecting surface 106 and is reflected into the core 104. The core 104 is any light source in the form of a surface. The core 104 acts as a light source by dispersing light traveling in it by using dispersing particles in the bulk or by etching one or more surfaces, etc. Mirror 109 is placed along each edge of core 104, except the one along which the linear light source 102 is placed.

FIG. 1B illustrates a block diagram of an exemplary light source system 199 as seen from a side, according to one embodiment. A primary light source 100 is coupled to a linear light source 102. A light source in the form of surface 104 (core), that is a sheet of transparent material. The linear light source 102 is placed at a focus point of a reflecting surface 106 that may be any light reflector. The light from the linear source travels towards the reflecting surface 106 and is reflected into the core 104. The core 104 also has a higher refractive index than cladding sheets 108. In alternate embodiments, the reflecting surface 106 is elliptical, circular or rectangular in shape.

FIG. 2A illustrates a block diagram of an exemplary light source system 299 as seen from the front, according to one embodiment. Primary light source 210 is coupled to the second linear light source 212 which is placed along the edge of core 104 opposite to the one along which the first linear light source 102 is placed. The core 104 is any light source in the form of a surface. The core 104 acts as a light source by dispersing light traveling in it by using dispersing particles in the bulk or by etching one or more surfaces. Mirror 209 is placed along each edge of core 104, except the edges along which the linear light sources 102 and 212 are placed. The linear light source 102 is placed at a focus point of a reflecting surface 106 which may be any light reflector, including metallic surfaces, distributed Bragg reflectors, hybrid reflectors, total internal reflectors or omni-direction reflectors. The second linear light source 212 is placed at a focus point of a reflecting surface 216 which may be any light reflector, including metallic surfaces, distributed Bragg reflectors, hybrid reflectors, total internal reflectors or omni-direction reflectors.

FIG. 2B illustrates a block diagram of an exemplary light source system 299 as seen from a side, according to one embodiment. A light source in the form of surface 104 (core) is a sheet of transparent material. The linear light source 102 is placed at a focus point of a reflecting surface 106 that may be any light reflector. The light from the linear source travels towards the reflecting surface 106 and is reflected into the core 104. The core 104 also has a higher refractive index than cladding sheets 108. Primary light source 210 is coupled to the second linear light source 212 which is placed along the edge of core 104 opposite to the one along which the first linear light source 102 is placed. The second linear light source 212 is placed at a focus point of a reflecting surface 216 which may be any light reflector, including metallic surfaces, distributed Bragg reflectors, hybrid reflectors, total internal reflectors or omni-direction reflectors.

FIG. 3 illustrates a block diagram of a light source system 399 as viewed from the front, according to one embodiment. Near one end of the linear light source column 304, a light source 308 is placed. The light source 308 may be an LED, or other similar light source. The light from the light source 308 enters the linear light source column 304. In an embodiment, the light from the light source 308 enters the linear light source column 304 using an optical arrangement such as a focusing reflector. Linear light source column 304 comprises a diffuser which may be constituted of small transparent particles or bubbles, which disperse light 314 by refraction, reflection at the boundary, by diffusion inside the particle, by scattering, or by total internal reflection. The light from the light source 308 is dispersed over the entire length of the linear light source column 304, and exits in all directions. Light exiting in the direction of the core, gets coupled to the core. Light exiting in other directions may be recycled using reflectors such as those described above in conjunction with FIG. 1A.

FIG. 4 illustrates a block diagram of an exemplary element 499 of a linear light source column 404, according to one embodiment. Element 499 has a very small height. Light 400 enters element 499. Some of the light gets dispersed and leaves the light guide as illumination light 402, and the remaining light travels on to the next linear light source element. The power of the light 400 going into element 499 is matched by the sum of the powers of the dispersed light 402 and the light continuing to the next element. The fraction of light dispersed 402 with respect to the light 400 entering the element 499 is the photic dispersivity of element 499. The photic dispersivity of element 499 is in direct proportion to the height of element 499. The ratio of the photic dispersivity of element 499 to the height of element 499 is the photic dispersion density of element 499. As the height of element 499 decreases, the photic dispersion density approaches a constant. This photic dispersion density of element 499 bears a certain relationship to the diffuser concentration at the element 499. The relationship is approximated to a certain degree as a direct proportion. By knowing the diffuser concentration of an element, the photic dispersion density of element 499 may be evaluated, and vice versa.

As the height of element 499 is reduced, power in the emanating light 402 reduces proportionately. The ratio of power of the emanating light 402 to the height of element 499, which approaches a constant as the height of the element is reduced, is the emanated power density at element 499. The emanated power density at element 499 is the photic dispersion density times the power of the incoming light (i.e. power of light traveling through the element). The gradient of the power of light traveling through the element 499 is the negative of the emanated power density. These two relations give a differential equation. This equation can be represented in the form "$dP/dh = -qP = -K$" where:

h is the distance of the linear light source element from the light source;
P is the power of the light being guided through that element;
q is the photic dispersion density of the element; and
K is the emanated power density at that element.

This equation is used to find the emanated power density given the photic dispersion density at each element. This equation is also used to find the photic dispersion density of each element, given the emanated power density. To design a particular linear light source with a particular emanated power density, the above differential equation is solved to determine the photic dispersion density at each element of the linear light source, such as linear light source 102. From this, the diffuser concentration at each element of a linear light source is determined. Such a linear light source is used in a light guide, to give a linear light source column of required emanated power density.

If a uniform concentration of diffuser is used in the linear light source, the emanated power density drops exponentially with height. Uniform emanated power density may be approximated by choosing a diffuser concentration such that the power drop from the edge near the light source to the opposite edge, is minimized. To reduce the power loss and also improve the uniformity of the emanated power, the opposite edge reflects light back into the linear light source column 499. In an alternate embodiment, another light source provides light into the opposite edge.

To achieve uniform illumination, the photic dispersion density and hence the diffuser concentration has to be varied over the linear light source length. This can be done using the above methodology. The required photic dispersion density is $q = K/(A-hK)$, where A is the power going into the linear light source 304 and K is the emanated power density at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an embodiment, H times K is kept only slightly less than A, so that only a little power is wasted, as well as photic dispersion density is always finite.

FIG. 5 illustrates a diagram of a linear light source column 599 having a varied concentration of diffuser particles, according to one embodiment. The concentration of the diffuser 502 is varied from sparse to dense from the light source edge (near light source 508) of linear light source column 504 to the opposite edge.

FIG. 6 illustrates an exemplary linear light source column 699 having two light sources 608, 609, according to one embodiment. By using two light sources 608, 609, high variations in concentration of diffuser 602 in the linear light source column 604 is not necessary. The differential equation provided above is used independently for deriving the emanated power density due to each of the light sources 608, 609. The addition of these two power densities provides the total light power density emanated at a particular core element.

Uniform illumination for light source 699 is achieved by photic dispersion density $q=1/\mathrm{sqrt}((h-H/2)^2+C/K^2)$ where sqrt is the square root function, ^ stands for exponentiation, K is the average emanated power density per light source (numerically equal to half the total emanated power density at each element) and $C=A\,(A-HK)$.

FIG. 7 illustrates a diagram of an exemplary mirrored linear light source column 799, according to an embodiment. By using a mirrored linear light source 704, high variations in concentration of diffuser 702 in the core 704 is not necessary. Top end 710 of the central linear light source column 704 is mirrored, such that it reflects light back into linear light source column 704. The photic dispersion density to achieve uniform illumination in light source 799 is:

$$q=1/\mathrm{sqrt}((h-H)^2+D/K^2)$$

where $D=4A\,(A-HK)$.

For any illumination system (such as the light sources in the form of surfaces 599, 699 and 799), the same pattern of emanation is sustained even if the light source power changes. For example, if the light source 708 of linear light source column 799 provides half the rated power, each element of the core 704 will emanate half its rated power. Specifically, a light guide core 704 designed to act as a uniform linear light source acts as a uniform linear light source at all power ratings by changing the power of its light source 708 or sources. If there are two light sources, their powers are changed in tandem to achieve this effect.

FIG. 8 illustrates a block diagram of an exemplary light source 899 for a backlight, according to one embodiment. Linear light source 802 is placed at the focus of a parabolic reflecting surface 806. Light ray 810 emanating out of the linear source 802 gets reflected from the reflector 806 and enters into the core 804.

Figure 9:
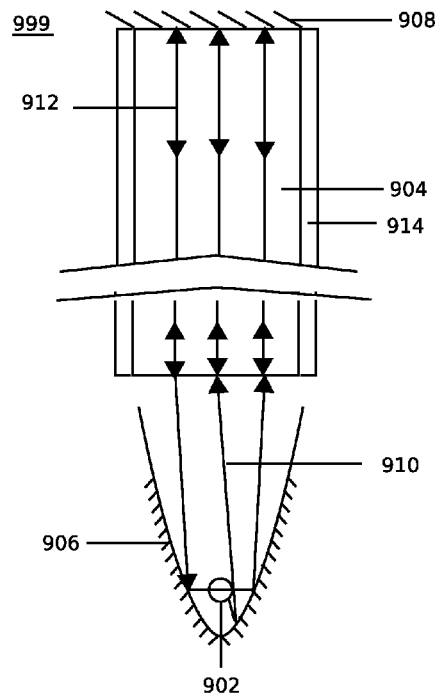
FIG. 9 illustrates a block diagram of an exemplary light source of a backlight, according to another embodiment.

FIG. 9 illustrates a block diagram of an exemplary light source 999 for a backlight, according to one embodiment. Cladding sheet 914 of lower refractive index than transparent core 904 is used. The core 904 is mirrored at the edge which is opposite the edge with the linear light source 902. The mirror 908 maybe any reflector including those described above in conjunction with FIG. 1A. Light ray 910 emanating out of the linear source 902 is reflected from the reflector 906 and enters into the core 904. Light ray 912 which reaches mirrored edge 908 of the core 904 gets reflected by the mirror 908. This ray 912 travels backwards and passes through the substantially transparent linear source of light 902. It then gets reflected by the reflector 906 and again enters core 904.

Figure 10:
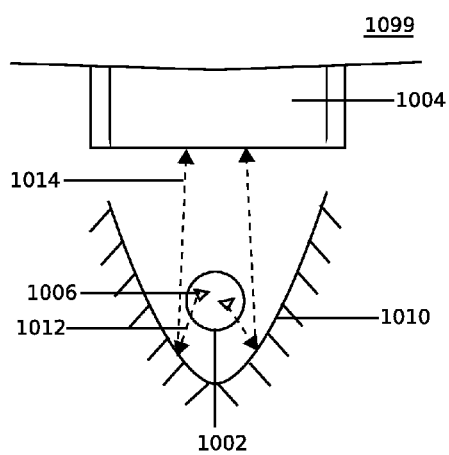
FIG. 10 illustrates a block diagram of a light coupling system, according to one embodiment.

FIG. 10 illustrates a block diagram of a light coupling system 1099, according to one embodiment. Linear light source 1002 is placed at a focus point of the parabolic reflecting surface 1010. Linear light source 1002 includes a sparse concentration of preferentially oriented particles 1006. Particles 1006 are oriented such that they disperse most of the light into the parabolic reflector 1010. Light ray 1012 emanating out of the linear source 1002 is reflected from the reflector 1010. The reflected ray of light 1014 reflects such that it is almost parallel to the sides of core 1004. Light ray 1014 is thus efficiently coupled to the core avoiding wastage of light in the core.

Figure 11:
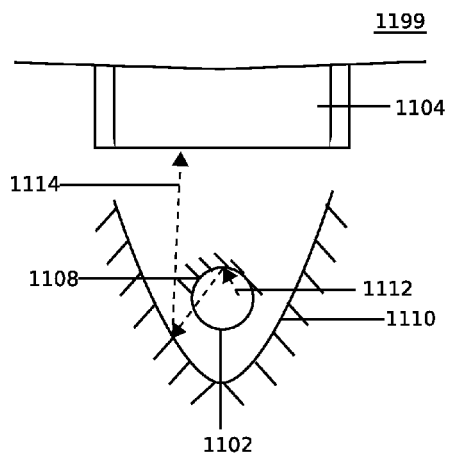
FIG. 11 illustrates a block diagram of a light coupling system, according to one embodiment.

FIG. 11 illustrates a block diagram of a light coupling system 1199, according to one embodiment. Linear light source 1102 is placed at a focus point of the parabolic reflecting surface 1110. A portion of the top surface of linear light source 1102 is covered by a reflecting surface 1108. The reflecting surface 1108 maybe any reflector including those described above in conjunction with FIG. 1A. Light ray 1112 inside the linear source 1102 gets reflected from the reflector 1108. The reflected ray of light 1114 reflects from the parabolic reflector 1110 such that it is almost parallel to the sides of core 1104. Light ray 1114 is thus efficiently coupled to the core 1104 avoiding wastage of light in the core 1104.

FIG. 12 illustrates a block diagram of a light coupling system 1299, according to one embodiment. Linear light source 1202 has a sparse distribution of light diffuser particles 1206. A portion of the bottom surface of linear light source 1202 is covered by reflecting surface 1208. The reflecting surface 1208 maybe any reflector including those described above in conjunction with FIG. 1A. Light ray 1214 while inside the linear source 1202 is reflected by the reflector 1208. The reflected ray of light is then incident on core 1204. Similarly upward traveling light ray 1212 is incident on core 1204. The bottom surface 1220 of the core 1204 is suitably shaped. In an embodiment, the bottom surface 1220 is elliptical in shape. Rays 1212 and 1214 straighten inside core 1204 and are efficiently coupled to the core 1204 avoiding wastage of light.

FIG. 13 illustrates a block diagram of a light coupling system 1399, according to one embodiment. Linear light source 1302 has a sparse distribution of light diffuser particles in it. Linear light source 1302 is placed within the cavity of the rectangular reflecting surface 1314. The reflecting surface 1314 may be any reflector including those described above in conjunction with FIG. 1A. Light ray 1303 inside the linear light source 1302 is reflected by reflector 1314. The ray of light 1303 may undergo one or more reflections and is then incident on core 1304. Similarly upward traveling light ray 1305 is incident directly onto the core 1304.

Controlling the Angle of Light Emanation

FIG. 14 illustrates a block diagram of an exemplary light source 1499 of a backlight, according to one embodiment. Linear light sources 1402 and 1403 are concentric transparent tubes placed at the focus of a parabolic reflecting surface 1410. In one of the embodiments, linear source 1402 has a greater refractive index than linear light source 1403. In an alternate embodiment, linear light sources 1402 and 1403 have the same refractive index and are separated by a lower refractive index cladding. Origin point of ray of light 1412 emanating from linear source 1402 is closer to the focus than the origin point of ray of light 1414 emanating from linear source 1403. Rays 1412 and 1414 are reflected from the parabolic reflecting surface 1410 and result in reflected rays 1416 and 1418 respectively. Ray 1416 entering the core 1404 will be more parallel than ray 1418. The ray 1416 provides a tighter angle of emanation from the core surface as compared to ray 1418. The angle of emanation of light from the core 1404 is controlled by controlling light fed to linear sources 1402 and 1403.

Coupling of Light to the Multicolored Illuminator

Figure 15:
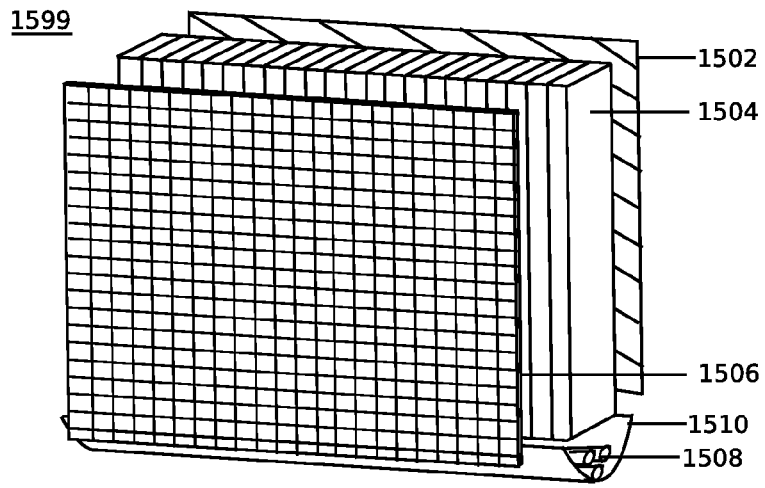
FIG. 15 illustrates a block diagram of an exemplary multicolored backlit display, according to one embodiment.

FIG. 15 illustrates a block diagram of an exemplary multicolored backlit display 1599, according to one embodiment. An image is displayed on a flat panel screen 1506. In an embodiment, the flat panel screen 1506 is an LCD screen.

Sheet 1504 has a number of columnar illuminators. Each illuminator illuminates one column of pixels. Different illuminators emanate light of different colors. Thus, light illuminating different pixel columns is of different colors. In an alternate embodiment, the illuminator column is not vertical. The surface 1502 is a reflecting surface which reflects light escaping the sheet 1504 in a direction opposite to the direction of screen 1506. Linear light sources 1508 are a number of linear light sources, each carrying a particular color of light. These linear light sources 1508 are placed inside the concave part of the reflector 1510. FIG. 15 illustrates the complete display system. Described henceforth, is a single column of the multicolored display system.

Figure 16A:
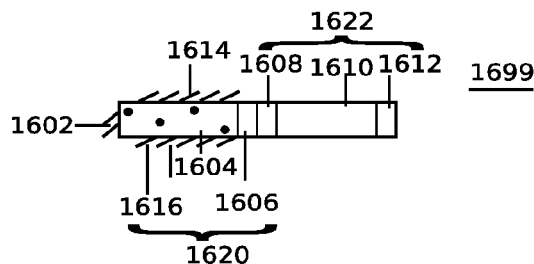
FIG. 16A illustrates a block diagram of an exemplary column of an exemplary backlit display system as viewed from the top, according to one embodiment.

FIG. 16A illustrates a block diagram of an exemplary column 1699 of an exemplary backlit display system as viewed from the top, according to one embodiment. Polarizer 1608, liquid crystal 1610 and polarizer 1612 together form light valve 1622 that modulates the intensity of light passing through it. Illuminator column 1604, cladding sheet 1606 and mirrors 1602, 1614 and 1616 together form a light guide 1620. Illuminator column 1604 has a higher refractive index than cladding sheet 1606. Light is guided inside the light guide 1620 by reflection or total internal reflection. Illuminator column 1604 has a sparse distribution of light diffuser particles. The light diffuser may be one or more of a metallic powder, metallic pigment, organic powder, and organic pigment, wherein the light diffuser reflects incident light. In an alternate embodiment, the light diffuser is one or more of a transparent particle, and transparent bubble. The light diffuser disperses light by refraction. Back-mirror 1602 reflects light from the back surface of column 1604. Side-mirrors 1614 reflect light from the side surfaces of column 1604. Side-mirrors 1614 prevent light from leaking into the adjacent columns. The mirrors 1602, 1614 and 1616 may be any reflector including those described above in conjunction with FIG. 1A.

Figure 16B:
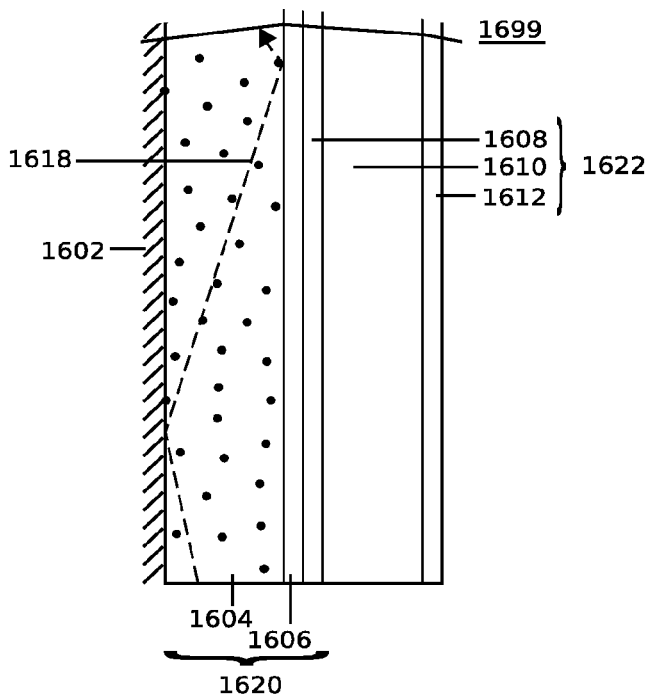
FIG. 16B illustrates a block diagram of an exemplary column of a backlit display system as viewed from the side, according to one embodiment.

FIG. 16B illustrates a block diagram of an exemplary column 1699 of an exemplary backlit display system as viewed from the side, according to one embodiment. Light ray 1618 is guided inside the light guide 1620 by reflection or total internal reflection. Polarizer 1608, liquid crystal 1610 and polarizer 1612 together form light valve 1622 that modulates the intensity of light passing through it. Illuminator column 1604, cladding sheet 1606 and mirror 1602 together form a light guide 1620. Illuminator column 1604 has a higher refractive index than cladding sheet 1606. Light is guided inside the light guide 1620 by reflection or total internal reflection. Illuminator column 1604 has a sparse distribution of light diffuser particles. Back-mirror 1602 reflects light from the back surface of column 1604.

Figure 16C:
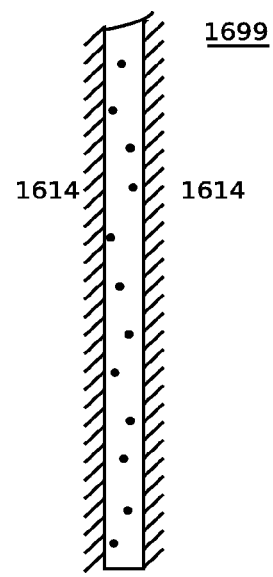
FIG. 16C illustrates a block diagram of an exemplary column of a backlit display system as viewed from the front, according to one embodiment.

FIG. 16C illustrates a block diagram of an exemplary column 1699 of a backlit display system as viewed from the front, according to one embodiment. Side-mirrors 1614 reflect light from the side surfaces of column 1604. Side-mirrors 1614 prevent light from leaking into the adjacent columns.

Figure 17A:
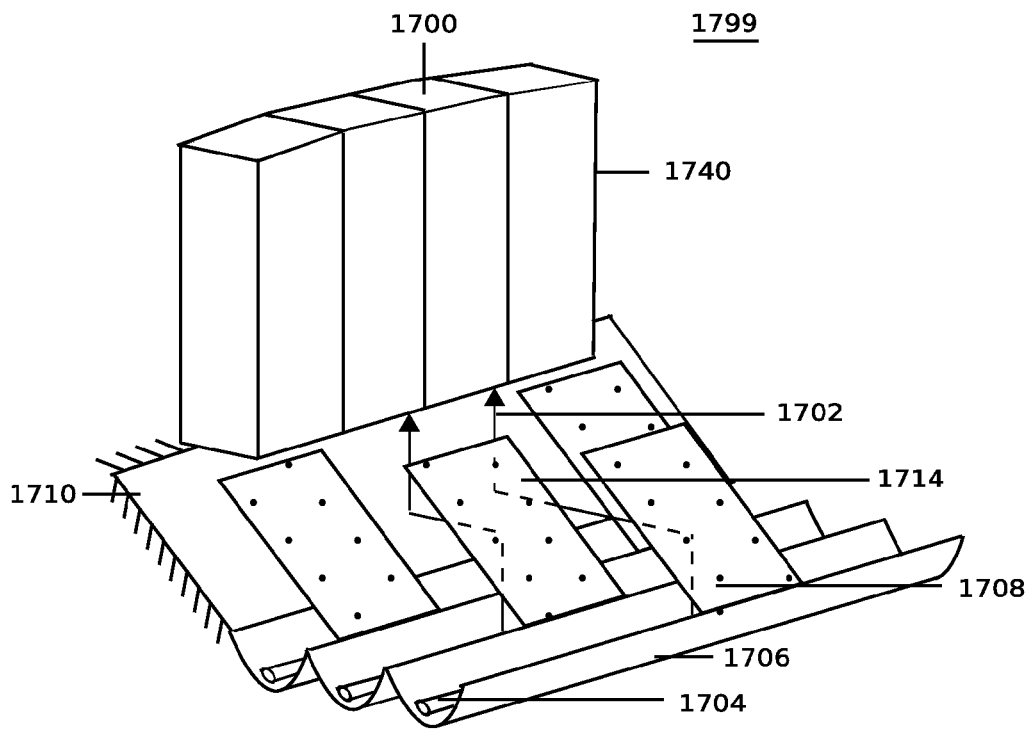
FIG. 17A illustrates a block diagram of an exemplary light source illuminating a multicolored illuminator, according to one embodiment.

FIG. 17A illustrates a block diagram of an exemplary light source 1799 illuminating a multicolored illuminator 1740, according to one embodiment. Light source 1799 has a number of linear light sources 1704. In one embodiment, the linear source of light is a transparent tube with a small concentration of microscopic dispersing particles as described above in conjunction with FIG. 1A. In an embodiment the dispersing particles have special shapes for directional extraction of light. Linear light source 1704 is placed at the focus of a reflecting trough 1706. In an embodiment, the shape of the trough 1706 is parabolic. Each light trough 1706 is partially covered by a mirror 1708. Mirrors 1708, 1714 are situated such that they reflect light from the linear light sources 1704 into corresponding columns of illuminator 1740. In one of the embodiments, one third of the area of the light trough 1706 is covered with mirror 1708. The mirrors 1708, 1714 may be any reflector including those described above in conjunction with FIG. 1A. Light of a first color 1702 undergoes reflection due to mirror 1708 and mirror 1710 and finally enters the corresponding illuminator column 1700.

Figure 17B:
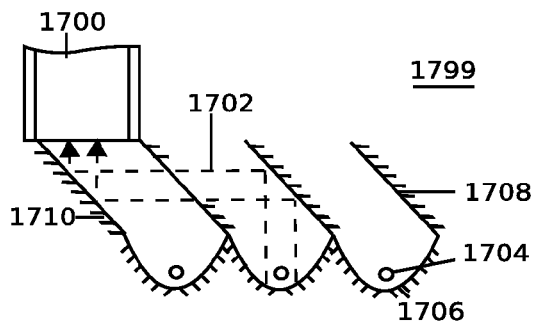
FIG. 17B illustrates a block diagram of an exemplary light source illuminating a multicolored illuminator column as seen from the front, according to one embodiment.

FIG. 17B illustrates a block diagram of an exemplary light source 1799 illuminating a multicolored illuminator column 1700 as seen from the front, according to one embodiment. Linear light source 1704 is placed at the focus of a reflecting trough 1706. In an embodiment, the shape of the trough 1706 is parabolic. Each light trough 1706 is partially covered by a mirror 1708. The mirror 1708 may be any reflector including those described above in conjunction with FIG. 1A. Light of a first color 1702 undergoes reflection due to mirror 1708 and mirror 1710 and finally enters the corresponding illuminator column 1700.

Figure 17C:
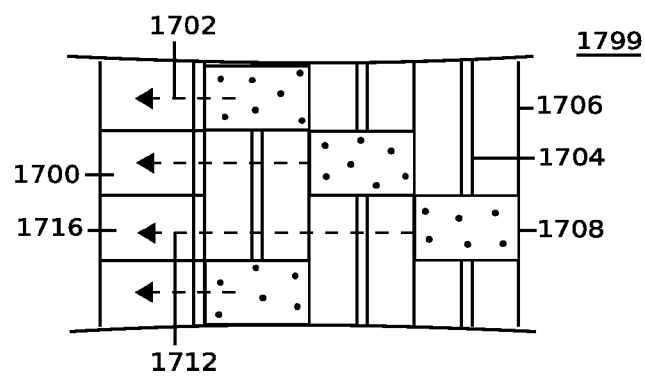
FIG. 17C illustrates a block diagram of an exemplary light source illuminating a multicolored illuminator column as seen from the top, according to one embodiment.

FIG. 17C illustrates a block diagram of an exemplary light source 1799 illuminating a multicolored illuminator column 1700 as seen from the top, according to one embodiment. Light of a first color 1702 undergoes reflection due to mirror 1708 and mirror 1710 and finally enters the corresponding illuminator column 1700. Each light trough 1706 is partially covered by a mirror 1708.

Figure 18A:
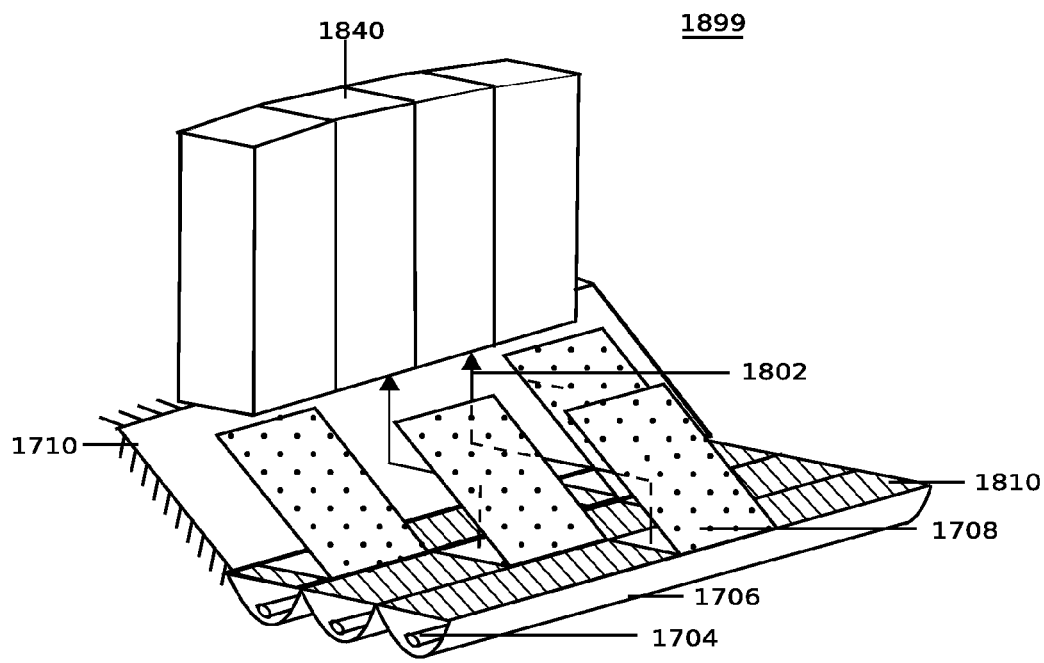
FIG. 18A illustrates a block diagram of an exemplary light source illuminating a multicolored illuminator, according to another embodiment.

FIG. 18A illustrates a block diagram of an exemplary light source 1899 illuminating a multicolored illuminator 1840, according to another embodiment. Mirror 1810 reflects light back into the light trough 1706. Mirror 1810 may be any reflector including those described above in conjunction with FIG. 1A. It prevents wastage of light from regions where light extraction is not supposed to happen.

Figure 18B:
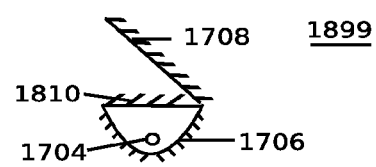
FIG. 18B illustrates a block diagram of an exemplary light source illuminating a multicolored illuminator column, as seen from the front, according to another embodiment.

FIG. 18B illustrates a block diagram of an exemplary light source 1899 illuminating a multicolored illuminator column, as seen from the front, according to another embodiment. Light of a first color 1702 undergoes reflection due to mirror 1708 and mirror 1710 and finally enters the corresponding illuminator column 1700. Each light trough 1706 containing light source 1704 is partially covered by a mirror 1810.

Figure 18C:
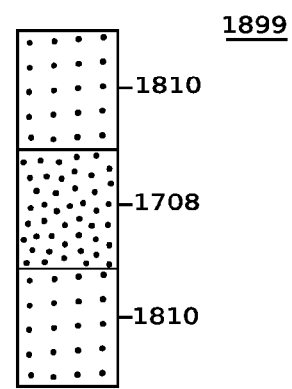
FIG. 18C illustrates a block diagram of an exemplary light source illuminating a multicolored illuminator column, as seen from the top, according to another embodiment.

FIG. 18C illustrates a block diagram of an exemplary light source 1899 illuminating a multicolored illuminator column, as seen from the top, according to another embodiment. Light of a first color 1702 undergoes reflection due to mirror 1708 and mirror 1710 and finally enters the corresponding illuminator column 1700. Each light trough 1706 containing light source 1704 is partially covered by a mirror 1810.

Figure 19:
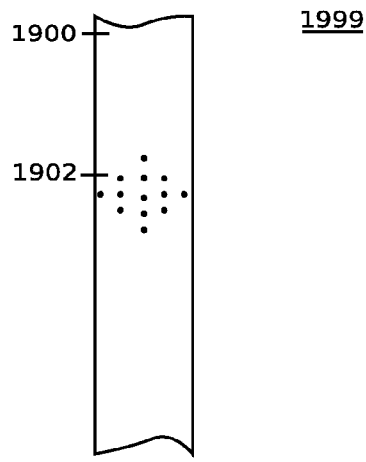
FIG. 19 illustrates a block diagram of an exemplary light source illuminating a multicolored illuminator column, according to one embodiment.

FIG. 19 illustrates a block diagram of an exemplary light source 1999 illuminating a multicolored illuminator column, according to one embodiment. Transparent tube 1900 includes spots 1902 of light dispersing particles. When light source 1999 is illuminated with light from an end, light is extracted at all such spots 1902. In an embodiment, such a light source 1999 is used in place of light source 1704 of light source 1799, with the spots 1902 being aligned to the mirrors 1708. To get the desired emanation of light such that same density of light is emanated at each spot, the differential equation presented in conjunction with FIG. 3 needs to be suitably modified and solved to get the disperser concentration at each spot.

Figure 20A:
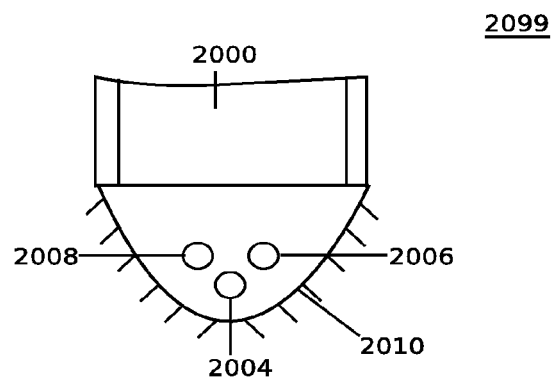
FIG. 20A illustrates a block diagram of an exemplary light source illuminating a multicolored illuminator column, according to one embodiment.

FIG. 20A illustrates a block diagram of an exemplary light source 2099 illuminating a multicolored illuminator column 2000, according to one embodiment. The linear light sources 2004, 2006 and 2008 are all placed inside a single trough 2010. In an embodiment, the trough comprises a parabolic reflecting surface which may be any reflector including those described above in conjunction with FIG. 1A. The light extracted from the linear light source enters the multicolored illuminator column 2000.

Figure 20B:
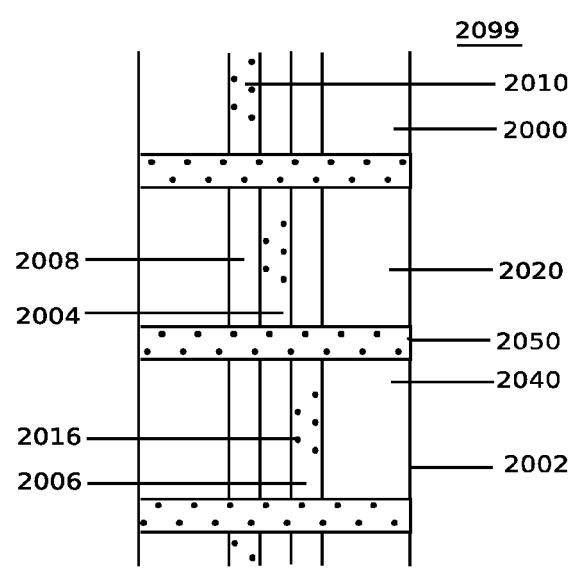
FIG. 20B illustrates a block diagram of an exemplary light source illuminating a multicolored illuminator column, according to one embodiment.

FIG. 20B illustrates a block diagram of an exemplary light source 2099 illuminating a multicolored illuminator column 2000, according to one embodiment. The linear sources of light 2004, 2006 and 2008 are transparent tubes with a small concentration of disperser particles 2016. The light extracted from the linear light sources 2004, 2006 and 2008 in trough 2002 enters the multicolored illuminator columns 2000, 2020 and 2040. The disperser is added at spots adjacent to corresponding illuminator columns. Reflector 2050 causes a large portion of light extracted from a particular linear source of light 2004 to enter the corresponding illuminator column 2020.

Coupling of Primary Light Source to a Linear Light Source

In one embodiment, the linear light source is a transparent tube with microscopic diffuser particles in it. So light from some source is coupled into this tube.

Figure 21:
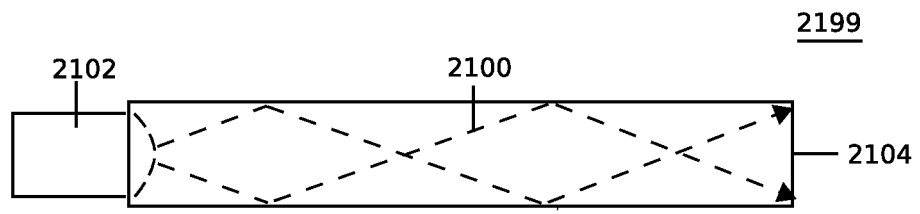
FIG. 21 illustrates a block diagram of an exemplary light source illuminating a linear light source according to one embodiment.

FIG. 21 illustrates a block diagram of an exemplary light source 2199 illuminating a linear light source, according to one embodiment. Light source 2102 is a primary light source. In an embodiment, light source 2102 is an LED. Some part of light source 2102 is inserted into the linear light source 2104. Light ray 2100, enters linear light source 2104. In an embodiment, light 2100 travels within the linear light source 2104 due to total internal reflection. In another embodiment, light 2100 travels within the linear light source 2104 due to reflection from a reflecting surface. The reflecting surface may be any reflector including those described above in conjunction with FIG. 1A.

Figure 22:
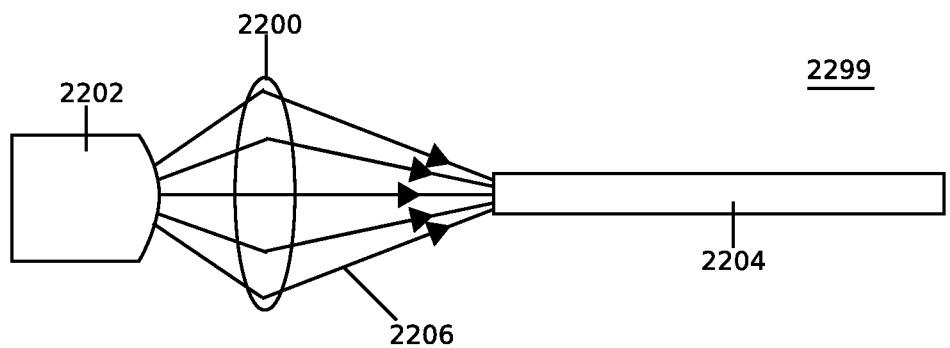
FIG. 22 illustrates a block diagram of an exemplary light source illuminating a linear light source according to one embodiment.

FIG. 22 illustrates a block diagram of an exemplary light source 2299 illuminating a linear light source, according to one embodiment. Light source 2202 is a primary light source. In an embodiment, light source 2202 is an LED. Light ray 2206, emanating from light source 2202 is passed through a lens 2200. In an embodiment, the lens 2200 is transparent and is made of glass or acrylic. Light ray 2206 may change its direction after going through lens 2200. It enters linear light source 2204.

An apparatus and method for coupling light from concentric illuminators into a light source in the form of a surface are disclosed. It is understood that the embodiments described herein are for the purpose of elucidation and should not be considered limiting the subject matter of the present patent. Various modifications, uses, substitutions, recombinations, improvements, methods of production without departing from the scope or spirit of the present invention would be evident to a person skilled in the art.

We claim:

1. An apparatus comprising:
   a plurality of concentric tubes,
   a sheet having a first edge, the plurality of concentric tubes placed along the first edge,
   wherein each tube of the plurality of concentric tubes has a distribution of light diffusing particles, and
   each tube of the plurality of concentric tubes diffuses light such that the light emanates in a predetermined pattern along the first edge of the sheet.

2. The apparatus of claim 1, further comprising a reflector that focuses light from the innermost tube of the plurality of concentric tubes onto the edge of first sheet.

3. The apparatus of claim 2, wherein the reflector focuses light from the innermost tube in such a way that light from the innermost tube enters the first sheet in a parallel manner.

4. The apparatus of claim 1, wherein the distribution of light diffusing particles in a tube of the plurality of concentric tubes is varied along the length of the tube.

5. The apparatus of claim 1, wherein the light diffusing particles include one or more of a metallic powder, metallic pigment, organic powder, organic pigment, and transparent bubble.

6. The apparatus of claim 1, wherein the light diffusing particles includes a transparent particle.

7. The apparatus of claim 1, wherein at least one tube of the plurality of concentric tubes has a distribution of light diffusing particles that is sparse such that the tube remains substantially transparent to light entering it from outside, or from another tube of the plurality of concentric tubes.

8. The apparatus of claim 1, wherein an inner concentric tube has a higher refractive index than an outer concentric tube.

9. The apparatus of claim 1, wherein two adjoining concentric tubes are separated by a cladding having a refractive index lower than both the concentric tubes.

10. An apparatus comprising:
    a plurality of concentric tubes,
    a sheet having a first edge, the plurality of concentric tubes placed along the first edge, and
    a means of independently controlling light fed into each of the plurality of concentric tubes,
    wherein each tube of the plurality of concentric tubes includes a light diffuser, and
    each tube of the plurality of concentric tubes diffuses light such that the light emanates in a predetermined pattern along the first edge of the sheet.

* * * * *